United States Patent [19]

Grossman et al.

[11] Patent Number: 5,010,221
[45] Date of Patent: Apr. 23, 1991

[54] MICROWAVEABLE COFFEE MAKERS

[75] Inventors: M. Gary Grossman, Riverside, Conn.; Edward H. Meisner, Short Hills, N.J.

[73] Assignee: GEE Associates, Edgewater, N.J.

[21] Appl. No.: 535,724

[22] Filed: Jun. 11, 1990

[51] Int. Cl.⁵ .............................................. H05B 6/80
[52] U.S. Cl. ...................... 219/10.55 E; 219/10.55 R; 99/306; 99/300; 99/DIG. 14; 426/241
[58] Field of Search .................. 219/10.55 E, 10.55 R; 99/305, 306, 300, 451, DIG. 14; 426/241, 243

[56] References Cited

U.S. PATENT DOCUMENTS

| | | | |
|---|---|---|---|
| 4,104,957 | 8/1978 | Freedman et al. | 219/10.55 E |
| 4,381,696 | 5/1983 | Koral | 219/10.55 E |
| 4,386,109 | 5/1983 | Bowen et al. | 426/241 |
| 4,577,080 | 3/1986 | Grossman | 219/10.55 E |

*Primary Examiner*—Philip H. Leung
*Attorney, Agent, or Firm*—Hedman, Gibson, Costigan & Hoare

[57] ABSTRACT

A drip-type coffee maker adapted for use in a microwave oven. The coffee maker includes a container which can dispense coffee directly into a receptacle therebelow and has an upper reservoir for holding water, a lower filter element for holding coffee grounds and a partition, which separates the reservoir and coffee filter element. The partition includes a portion thereof adapted to close and open communication between the reservoir and the filter element, and a non-toxic heat responsive sealing substance adapted to releasably seal the partition portion in the closed position until water in the reservoir reaches a temperature for brewing coffee. When the water in the reservoir reaches a desired brewing temperature, the heat responsive seal releases the portion by melting, dissolving or the like, opening the reservoir to the filter element to the flow of the heated water into and through the filter element and coffee grounds to produce freshly brewed coffee which can be directly dispensed into a receptacle therebelow.

8 Claims, 2 Drawing Sheets

MICROWAVEABLE COFFEE MAKERS

FIELD OF THE INVENTION

This invention is directed to a convenient, time saving coffee maker adapted for use in a microwave device. This invention also relates to a relatively inexpensive, simple, disposable, drip-type, microwave coffee maker adapted to dispense freshly brewed coffee directly into a cup, mug or the like.

BACKGROUND OF THE INVENTION

U.S. Pat. No. 4,577,080 of assignee discloses a coffee maker which is well suited for use in a microwave oven. The coffee maker of the patent includes a container having a reservoir for water, a filter element for coffee and a partition between the reservoir and filter element having at least one perforation or aperture therein adapted to be sealed or closed by the use of a non-toxic heat responsive substance until the water reaches a brewing temperature. When the desired temperature is reached, the heat responsive substance causes the aperture to open and allow the heated water to flow therethrough into the filter element and coffee grounds to become freshly brewed coffee ready for dispensing.

The present invention relates to additional coffee makers which are well suited for use in microwave ovens.

SUMMARY OF THE INVENTION

The coffee maker of the present invention, which also is well suited for brewing and dispensing coffee in a microwave oven, includes a container having a reservoir and a coffee filter element. The coffee maker of the present invention also includes a partition which separates the reservoir and coffee filter element and which, in this invention, comprises a body having an aperture or opening therein, a member adapted to be positioned above and over the aperture and a non-toxic heat responsive seal between the partition body and member releasably securing the member to the body for sealing the aperture until the water in the reservoir reaches a brewing temperature. In use, the seals loses its sealing properties (e.g. melts, dissolves or the like) when the water in the reservoir reaches a brewing or desired temperature, whereupon the member is released from the partition body and the aperture opens to the flow of heated water for brewing and dispensing in and from the filter element.

In a preferred embodiment of the coffee maker of the present invention, the partition body is in the form of a ring which has a central flow restricting aperture therethrough closed by a member in the form of a disk which is releasably secured to the underside of the partition body by a seal on the upper surface of the disk. Preferably, the seal comprises a non-toxic substance which melts, dissolves or the like at the desired temperature.

In use water is placed in the reservoir and the container can be positioned over or on a cup, mug or other coffee receptacle and the assembly is placed in a microwave oven. When the water reaches a desired temperature (e.g. coffee brewing temperature) the non-toxic temperature responsive heat sealing substance loses its sealing properties by melting, dissolving or the like and releases the disk and opens the aperture, whereupon the disk drops into the filter element and heated water flows through the aperture to become freshly brewed coffee in the filter element which is dispensed into the receptacle therebelow.

BRIEF DESCRIPTION OF THE DRAWINGS AND DETAILED DESCRIPTION OF THE INVENTION

The following is a brief description of the drawings and a detailed description of illustrative embodiments of the invention. It is to be understood that the invention is capable of modification and variation apparent to those skilled in the art within the spirit and scope of the invention.

Figure 2:
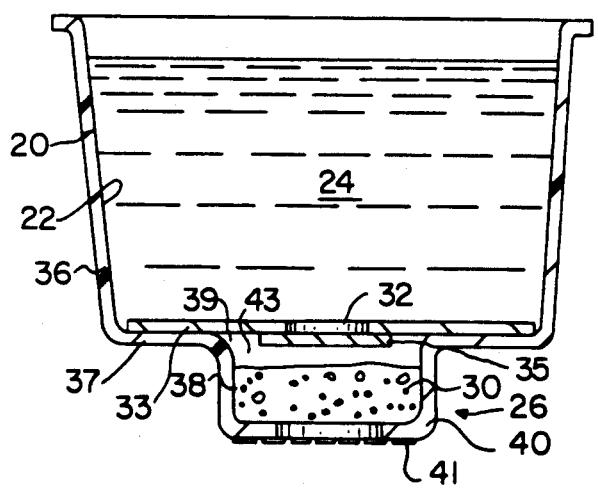
FIG. 2 is a front elevational view, in section, of the coffee maker shown in FIG. 1.
Figure 3:
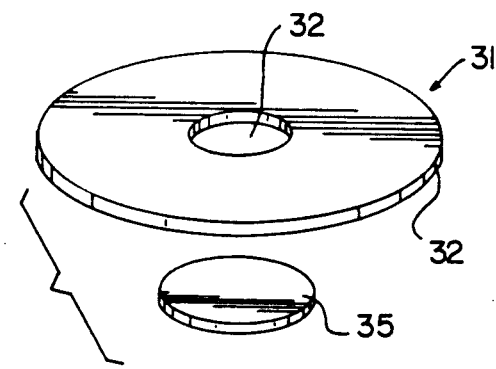
FIG. 3 is an exploded view of the partition body and disk of the preferred embodiment of the invention illustrated in FIG. 2.
Figure 4:
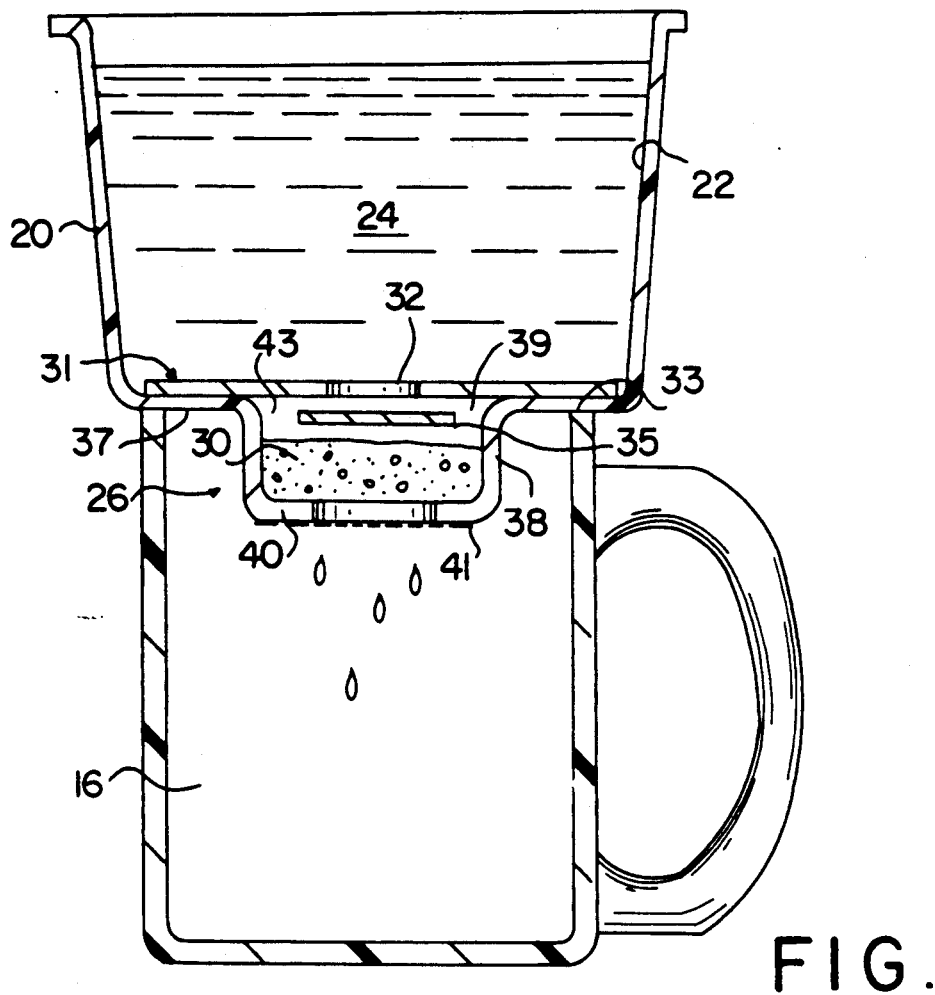
Figure 5A:
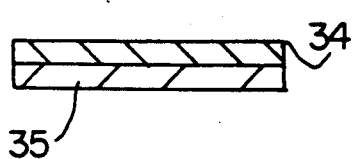
Figure 5B:
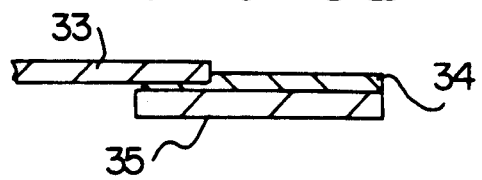

FIG. 4 is a front elevational view, in section, of the coffee maker of FIG. 2 resting on a coffee mug and illustrating the operation of the invention when the heated water reaches a brewing temperature; and FIGS. 5A and 5B are enlarged detail views, in section, illustrating the non-toxic heat responsive sealing substance on the disk of the preferred embodiment of the invention (FIG. 5A) and the disk releasably secured to the partition body for sealing the aperture (FIG. 5B).

Figure 1:
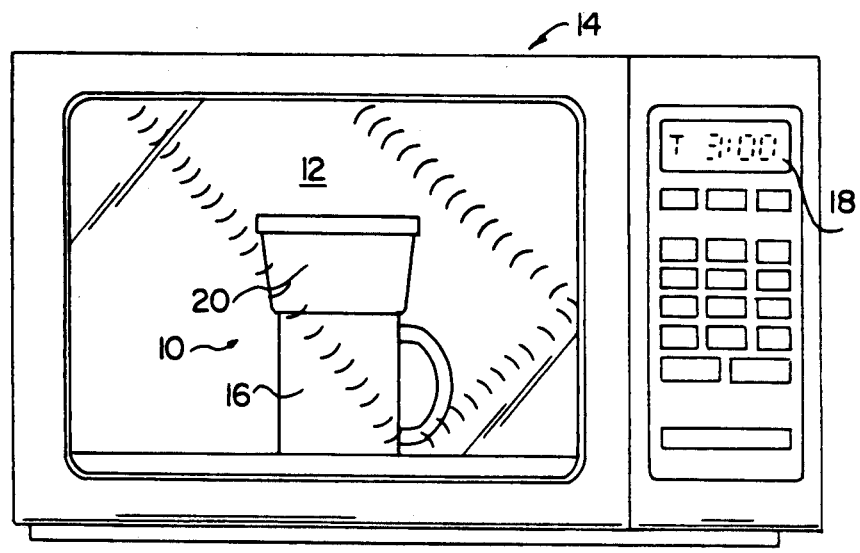
FIG. 1 is a front pictoral view of a microwave oven with a preferred embodiment of the coffee maker of the present invention therein.

Referring to the drawings and first to FIG. 1, there is shown a single cup microwave drip-type coffee maker 10 embodying the invention. The coffee maker 10 is positioned in a cavity 12 of a conventional microwave oven 14. A coffee receptacle 16 is situated below the coffee maker 10 for receiving the freshly brewed coffee. Microwave energy is provided to the cavity 12 by a magnatron (not shown). The duration of the microwave energy is controlled by a timer 18. Other conventional microwave features are not shown and described as they are well known in the art and are not part of the present invention.

Referring now to FIG. 2, the coffee maker 10 comprises a container 20 having two compartments, an upper reservoir 22 for holding water 24, and a lower filter element 26 for holding a premeasured amount of coffee 30 and providing sufficient space for the expansion of coffee grounds upon contact by water 24 from the reservoir 22. A partition 31 separates the upper reservoir 22 from the lower coffee filter element 26. The partition 31 includes a body 33 having a central aperture or opening 32, a member 35 positioned under the body and over the aperture 32, and a heat responsive non-toxic seal 34 for sealing the aperture 32. The sealing is achieved by adhering the element 35 to the underside of the body 33 by the seal 34 until a brewing temperature for the water is reached, e.g. about 130° F. to about 220° F. (59° C. to 100° C.), at which time the member 35 is released from the body 33 dropping into the filter element 26 and opening the aperture 32. By virtue of the relative breadth or size of the reservoir 22 and of the aperture 32, the heated water flows from the larger reservoir 22 through the smaller aperture 22 and into the coffee filter element 26 in a restricted manner.

The upper compartment or reservoir 22 is open at the top, has generally cylindrical side walls 36 and a bottom wall 37 which can include the partition 31. As illustrated the bottom wall 37 is an annular shoulder with a relatively large opening 39 above the filter element 26.

The walls 36 and 37 preferably are made of a microwave permeable material, such as polypropylene, polyethylene, foamed styrene and polyethylene vinyl acetate coated paperboard.

As illustrated in FIG. 2, the partition 31 is positioned on the bottom wall 37 and extends across the opening 39. In the preferred embodiment of the coffee maker the body 33 is an annular ring which can be heat sealed to the bottom wall 37. The illustrative ring 33 is composed of a relatively stiff, water tight material to keep the water in the reservoir portion of the coffee maker until the water is heated to the temperature at which coffee brews. The ring 33 also is capable of and does support the member 35 covering the sealed central aperture 32 to prevent the premature flow of water from the reservoir 22 into the coffee filter element 26.

The illustrative member 35 of the preferred embodiment of the invention is the form of a disk composed of a stiff, water tight material, such as the material of the ring 33. The disk 35 has a breadth or diameter which is greater than the breadth or diameter of central aperture 32 so that the peripheral portion of the disk 35 extends over the underside portion of the ring 33 about and adjacent to the aperture 32.

The heat responsive non-toxic seal 34 is positioned between the ring 33 and the disk 35 and secures the disk 35 under and to the ring 33 over the aperture 32 to close or seal the aperture 32 until a brewing temperature is reached. The seal 34 can be deposited on the disk 35 or on the ring 33, or on both the disk 35 and ring 33 prior to closing the aperture 32. As shown in FIGS. 5A and 5B, the seal 34 is applied to the upper surface of the disk 35 in the form of a layer (FIG. 5A) and the disk 35 is adherently secured to the underside (or lower surface) of the ring portion about the aperture 32 (FIG. 5B) by pressing (with or without heat) the disk 35 against the ring 33 to close and seal the aperture 32.

The seal 34 comprises a heat responsive substance which will melt, dissolve, etc. upon reaching the desired temperature, i.e., a brewing temperature, and thereby cause the disk 35 to separate and drop from the ring 33 into the coffee filter element 26 as illustrated in FIG. 4. The thermally responsive substance of the seal 34 includes non-toxic waxes, such as natural and synthetic waxes including beeswax, paraffin, carnauba, polyethylene, high density polyethylene glycol, e.g. CARBOWAX and other non-toxic plastic materials which melt, dissolve or the like at desired coffee brewing temperatures.

The lower compartment of filter element 26 includes integral side walls 38 which extend downwardly from the bottom wall 37 of the reservoir 22. As shown, the filter element 26 is tubular with the partition 31 across its upper end. At the lower end of the coffee filter element 26 is an annular shoulder or open bottom wall 40 which extends inwardly for securing a filter 41 thereon and through which the brewed coffee is filtered. The filter 41 preferably is made from conventional filter paper for coffee which is adhesively secured or heat sealed to the annular shoulder 40, and the filter 41 further serves to trap or retain thermally responsive substance which has passed through the coffee grounds 30. As illustrated in FIG. 2, the partition 31 and filter element 26 provide a chamber 43 with sufficient volume for holding the dry coffee grounds and for allowing the expansion of the coffee grounds during brewing without binding or compacting thereof. By so doing, the expanded coffee grounds do not inhibit the flow of water therethrough The coffee maker 10 also can include means for positioning or resting the coffee maker 10 above or on the receptacle 16. As shown in FIG. 4, the coffee maker 10 includes a larger upper reservoir 22 having a bottom wall 37 which rests on the mug 16 while the smaller filter element 26 depends from the wall 37 into the mug 16.

In manufacture, the coffee maker 10 can be formed by conventional techniques, such as molding or thermoforming. Thereafter, the required amount of coffee can be pre-measured and placed in the chamber 28 of the coffee filter element 26 and the filter 41 added. If desired, the coffee does not have to be placed in the chamber 28 at the point of manufacture but can be added at any time prior to use. In such instance, the filter element 26 can be of a removable type or it can be separately provided.

In an illustrative embodiment of the coffee maker 10 of FIGS. 2-5B the reservoir 22 is molded from polypropylene, has a breadth or diameter of about 4.0 inches and has a capacity of about 9.0 ounces. The partition body 33 and the disk 35 are made from SBS 18 point (about 0.02 inches thick) board and the body 33 is coated with EVA (ethylene vinyl acetate) having a thickness of about 1.0 mil (0.001 inches) for heat sealing the partition 31 in the reservoir 22. The partition body 33 has a breadth or diameter of about 3.50 inches and the aperture 32 has a breadth of about 0.75 inches, and the disk 35 has a breadth or diameter of about 1.0 inches. The non-toxic heat responsive seal 34 is formed from beeswax and has a thickness of about 0.001 inches.

In using the illustrative coffee maker 10 to brew a cup of fresh drip-type coffee in a microwave oven, the reservoir 22 is filled with tap water, the filled coffee maker is positioned on a cup or the like and the assembly is placed in the microwave oven 14. The microwave oven 14 is set for a predetermined time on the timer 18. It has been found that in a 700 watt microwave oven, one cup (9 ounces) of tap water will reach 200° F. in about 2.0 minutes. As the water reaches the brewing temperature, e.g. 200° F., the heat responsive seal 34 melts, dissolves or the like to release the disk 35 from the ring 33, whereupon the disk 35 drops into the filter element 26. In doing so the aperture 32 is opened allowing the heated water to flow out of the reservoir 22 through the aperture 32 and into the coffee grounds 30 in the filter element 26. There the heated water 24 dissolves a portion of the coffee grounds 30 to produce freshly brewed coffee. Portions of the thermally responsive substance 34 may be retained either in the coffee grounds 30 or the filter 41. During this stage of the process, the microwave oven 12 can be turned off and the freshly brewed coffee continues to flow through the filter 41 and into the receptacle 16 below. The dripping process takes about two minutes. At this point, the assembly is removed from the microwave oven 12, and the coffee maker 10 removed from the cup or the like and the coffee is ready for drinking.

While a single cup coffee maker is shown in the illustrative embodiment, it is to be understood that larger coffee makers with a correspondingly larger receptacles may be employed. These embodiments of the invention can provide more than one cup of freshly brewed coffee in the receptacles from which individual cups of coffee can be poured.

Also, to prepare the freshness of the coffee grounds, the coffee maker 10 or separable coffee filter element 26 can be packaged in a freshness container or bag, or the filter elements 26 can include removeable freshness seals, or both measures can be utilized to maintain freshness of the coffee grounds.

The invention in its broader aspects is not limited to the specific described embodiment and departures may be made therefrom within the scope of the accompanying claims without departing from the principles of the invention and without sacrificing its chief advantages.

What we claim is:

1. A drip-type coffee maker adapted to discharge freshly brewed coffee, comprising:
   a reservoir for holding water to be heated to a temperature for brewing coffee,
   a coffee filter element adapted to hold coffee grounds and to receive the heated water from said reservoir and dispense freshly brewed coffee therefrom, and
   a partition between said reservoir and said coffee filter element, including a body having at least one aperture therein, a member adapted to cover said aperture, and a non-toxic heat responsive sealing substance adapted to releasably secure said member to the underside of said body and over said aperture to seal said opening until water in said reservoir reaches a temperature for brewing coffee, whereupon said heat responsive substance is adapted to release said member from said body which drops therefrom into said coffee filter element to open said aperture to the flow of heated water therethrough and into said filter element and the coffee grounds to become freshly brewed coffee ready for dispensing from the coffee maker.

2. A drip-type disposable coffee maker for use in a microwave device adapted to produce freshly brewed coffee to a receptacle therebelow, comprising:
   a reservoir adapted to hold water to be heated by the microwave device, including an opening in the top of said reservoir for receiving the water and microwave permeable peripheral walls,
   a coffee filter element connected to the lower end of said reservoir adapted to hold a premeasured amount of coffee therein and including a filter at its lower end for filtering brewed coffee therethrough, and
   a partition between said reservoir and said coffee filter element, including a body having at least one aperture therein, a member adapted to cover said aperture, and a non-toxic heat responsive sealing substance adapted to releaseably secure said member to the underside of said partition body and over said aperture to seal said aperture closed until the water in said reservoir is heated to a temperature for brewing coffee by the microwave device, whereupon said heat responsive sealing substance is adapted to release said member into said coffee filter element and thereby open said aperture to the heated water which will flow through the aperture into said filter element and the coffee grounds to become freshly brewed coffee, which, in turn, will flow through said filter and into a receptacle therebelow.

3. The coffee maker of claims 1 or 2:
   wherein said partition body is an annular ring in the lower portion of said reservoir and is in water-tight relationship therewith,
   wherein said aperture in said body is centrally positioned therein, and
   wherein said member is a disk on the underside of said partition body and is of a breadth sufficient to cover said opening and overlie the portion of said body adjacent to said opening.

4. The coffee maker of claim 3, wherein said heat responsive sealing substance is on the upper surface of said disk and is in adhering contact to the underside of said partition body adjacent said opening for closing said opening and releasably sealing said disk thereto.

5. The coffee maker of claim 3 wherein said filter element is removable from said reservoir.

6. The coffer maker of claim 3 wherein at least a portion of said heat responsive sealing substance melts at-coffee brewing temperatures.

7. The coffee maker of claim 3 wherein at least a portion of said heat responsive sealing substance dissolves at coffee brewing temperatures.

8. The coffee maker of claim 3 wherein said heat responsive sealing substance is selected from the group consisting of natural and synthetic waxes.

* * * * *